United States Patent Office 2,947,793
Patented Aug. 2, 1960

2,947,793

PREPARATION OF ALKYLENE DILITHIUM COMPOUNDS

Kenneth C. Eberly, Akron, Ohio, assignor to The Firestone Tire & Rubber Company, Akron, Ohio, a corporation of Ohio No Drawing. Filed Mar. 5, 1958, Ser. No. 719,189

12 Claims. (Cl. 260—665)

This invention relates to the preparation of alkylene dilithium compounds.

The alkylene dilithiums have come into some importance of late as catalysts for the polymerization of diolefins. Heretofore these compounds have been prepared by reacting alkylene dihalides with lithium metal in a diethyl ether medium. This method has the serious disadvantage, so far as the products may be used for catalyzing the polymerization of diolefins, that the ether must be removed from the product; the presence of ether is highly detrimental to the properties of polymerization products. Even when the product is to be used for purposes other than polymerization, the presence of the ether is undesirable since it tends to react with and degrade the alkylene dilithium over a period of time. The removal of ether is carried out by distilling the product and chasing with hydrocarbon solvents; however the removal is far from complete, as the ether appears to form a complex with the alkylene dilithium.

Accordingly it is an object of this invention to provide a novel process for the manufacture of alkylene dilithium compounds.

Another object is to prepare alkylene dilithium compounds in the absence of ether solvents.

A further object is to provide such a process which makes use of hydrocarbon solvents.

A still further object is to provide such a process which requires only cheap and readily available materials, and can be carried out with only a minimum of skilled attendance.

SYNOPSIS OF THE INVENTION

The above and other objects are secured, in accordance with this invention, in a process in which finely divided lithium metal is contacted with an alkylene dihalide, and the mass is subjected to a grinding action. The lithium reacts with the alkylene dihalide to yield an alkylene dilithium. Preferably, in order to moderate the reaction and to facilitate heat removal, there should also be present a hydrocarbon solvent. Preferably also, the lithium metal should contain small amounts of a higher alkali metal, such as sodium or potassium, alloyed therein.

THE GRINDING ACTION

There may be employed in this invention any mode of grinding action in which the particles of lithium in the reaction mass are subjected to a simultaneous grinding and crushing action between surfaces which are, in relation to the particles of lithium, relatively hard and massive. Particularly suitable for this purpose are rod, ball and pebble mills. Likewise suitable are devices such as the "Attritor" in which the reactants, together with a mass of balls, pebbles or the like, are stirred by means of agitator arms. Other types of mills are disc mills, hammer mills, roller paint mills, kollergangs and the like, wherein the ingredients are passed between relatively moving surfaces at close clearances. Likewise, there may be employed impact mills, in which the ingredients are projected under pressure as a high-velocity jet against a hard target. In general, any equipment may be used which will forcibly thrust the granular lithium against a hard surface with local stresses in excess of the strength of the lithium metal. The grinding surfaces i.e., ball- and rod-mill liners, tumbling elements, disc mill discs, paint mill rollers, etc., of the apparatus may be of any substance which is non-reactive with lithium at the temperatures at which the process is conducted, and which is sufficiently hard (say 3.0 or more on Moh's scale) to crush the granular lithium without damage to itself. Exemplary materials for such grinding surfaces are natural stony materials such as granite, marble, quartz and the like; ceramic materials such as glass, fused quartz and porcelain; and various hard, non-corrosive metals such as stainless steel, Monel metal, nickel and the like.

THE LITHIUM METAL

The lithium metal employed in the process of this invention should be in a fine state of subdivision, as the reaction occurs essentially at the surface of the metal, and the finer the division, the more surface will be available for the reaction. In general it will be desirable to have the metal in the form of granules ranging in diameter from 0.001 to 1 mm. A subordinate but nevertheless important feature of the invention involves alloying, with the lithium, small amounts (say 0.03–1.0%, based on the weight of lithium) of other alkali metals such as sodium, potassium, rubidium and cesium. It is found that the presence of these other alkali metals substantially accelerates the rate of reaction in the practice of the invention. In order to exert this accelerating action, these extraneous alkali metals must be alloyed with the lithium—i.e., dissolved therein so as to form a single phase therewith. It is not sufficient that these extraneous alkali metals be present as a separate phase of granules distinct from the lithium granules.

THE ALKYLENE DIHALIDES

Alkylene dihalides suitable for use in this invention comprise any alkanes containing from 3 to 8 carbons inclusive, in which two non-adjacent hydrogen atoms have been replaced by halogen atoms. Suitable alkylene halides will be seen to include 1,3-dichloropropane, 1,4-dichlorobutane, 1,5-dichloropentane, 1,6-dichlorohexane, 1,8-dichlorooctane, 1,4-dibromobutane, 1,6-diiodohexane, 1,6-dichloro-3-methyl hexane, 1,7-dichloroheptane, 1,8-dichlorooctane, and the like. Chlorides are preferable in usage to bromides, and bromides are preferable to iodides.

THE SOLVENT

As above noted, it is preferable to carry out the reaction in the presence of a solvent. Although no explosive reactions have ever been observed in the practice of this invention, it is thought that such reactions might occur in the absence of a diluent, particularly in the case of the lower alkylene dihalides such as 1,3-dichloropropane. The presence of substantial quantities of solvents avoids this possible danger. Also, in the latter stages of the reaction, alkylene dihalide is largely consumed and, if no other liquid is present, the reaction mass becomes rather difficult to handle. Likewise, the solvent provides a certain measure of protection for the reactants and products against any accidental or unavoidable exposure to the atmosphere. Suitable solvents are in general the lower, relatively fluid hydrocarbon solvents (containing 4 to 14 carbon atoms) free from ethylenic unsaturation, such as pentane, hexane, petroleum ether, kerosene, benzene, toluene, xylene and the like. Higher hydrocarbon liquids containing up to 30 or 40 carbon atoms, such as mineral oil, lubricating oil and the like may also be used; however, their considerable viscosity would interfere substantially with the grinding action, particularly in those cases where the reaction is carried out in rod mills and other tumbling mills. The reaction medium should, of course, be free from ether and other polar solvents. In general it is desirable that the solvent be present to the extent of at least 75% (there would be no theoretical maximum) and preferably 75% to 85%, based on the total volume of alkylene dihalide and solvent. As the volume percent decreases below 75%, the danger of uncontrollable reaction progressively increases.

THE CONDITIONS OF REACTION

In general, the reaction is carried out by grinding together the materials at temperatures in the range 0° to 60° C. inclusive. Temperatures in the intermediate portion of the range, say 20°–35° C. are preferred, as this results in a more rapid rate of reaction under any given conditions of grinding, reactant composition etc., and also decreases the proportions of side reactions such as Wurtz-Fittig reactions. At temperatures of 40° C. and above the reaction often gets out of control, and if it is desired to operate in this range, extremely efficient cooling and/or reaction quenching means should be provided. The length of time over which the reaction is prosecuted is, of course, without any theoretical limits; some alkylene dilithium will be produced in the first instant of grinding, and no harm will ensue if the grinding is prolonged indefinitely. With power inputs to the grinding operation of 0.2 to 1.1 watts/gram of lithium metal, the reaction will generally have progressed to an economic extent, say 90% or better, within 18 to 72 hours. In any event, the progress of the reaction can be followed analytically, as explained below.

The chief undesirable side reaction in the treatment of alkylene dihalides with lithium is the Wurtz-Fittig formation of higher alkylene chains and cycloalkanes. It appears from the applicant's experience (although there is no a priori reason why this should be so) that this reaction is favored by scarcity of unreacted alkylene dihalide. Accordingly it is preferred to keep the concentration of this material as high as practical; for instance, all of the alkylene dihalide should be charged at the outset of the reaction, rather than dosed incrementally during the process. It is preferred to charge the reactants in approximately equivalent proportions, i.e., one gram-mole of alkylene dihalide to four gram-atoms of lithium metal, and to charge the full amount of these materials at the outset of the process. It will be understood, of course, that the above is merely the preferable course, and that departures therefrom may be made if, for one reason or the other, the undesirable consequences will be accepted; for instance the lithium metal may be used in excess, although this is usually not desirable, by reason of the expense of this reagent.

The highest conversion of the reactants to the desired alkylene dilithium products is secured under those conditions favoring the highest possible rate of reaction without loss of control; ideally, it would be desirable to conduct the process so that the reaction is completed substantially instantaneously. However, the reaction is exothermic and the heat transfer of the reaction mass is relatively poor; hence any local overheating is instantly compounded and takes the reaction out of control. In general, it will be desirable to operate under conditions as nearly as possible at the boundary of loss of control; for instance, temperatures on the order of 25°–30° C., and the use of alloys of lithium with 0.3–0.6%, based on the weight of the alloys, of other alkali metals, yield excellent results without being undesirably close to conditions of loss of control, providing, of course, that efficient cooling means are employed.

It will be understood that the reaction should be carried out in the absence of air, moisture, or other materials which are reactive with lithium. Closed reaction vessels should be used, and the free spaces thereof should contain only the vapors of the alkylene dihalide, solvent and inert gases such as helium, argon and the like.

ANALYTICAL CONTROL OF THE REACTION

Two general types of reaction occur during the applicant's process, represented by the following equations, in which
"|half-alkylene-" represents one end of an alkylene radical, and "hal" represents a halogen atom:

The desired replacement of halogen with lithium;

(1) 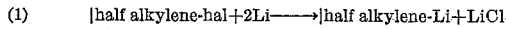

(I)

Wurtz-Fittig reactions, represented overall without intermediate steps;

(2) 

(II)

If a sample of the reaction is decomposed with water at any stage, the following reactions take place:

(3) 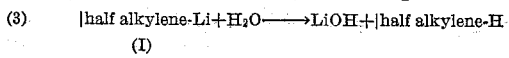

(I)

(4) 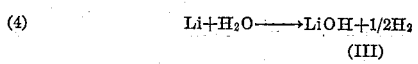

(III)

The lithium hydroxide from Reactions 3 and 4 may be titrated with hydrochloric acid against phenolphthalein or methyl orange. It will be seen that each gram-mol of |half-alkylene-Li formed per Equation 1 results in the loss of 2 gram-atoms of lithium metal, but forms 1 gram-mole of lithium hydroxide per Equation 3, making a net loss of 1 gram-mole of lithium hydroxide overall. The formation of 1 gram-mole of ½(|half alkylene)$_2$ also results in a loss of 1 gram-mole of lithium hydroxide. Thus the decrease in titer of the reaction mass from one time to another during the reaction is a direct measure of the sum of the moles of |half alkylene-Li plus ½(|half alkylene)$_2$ formed, or conversely, it is a direct measure of the lithium metal and of the |half alkylene-hal consumed during the interval. The titration does not distinguish between reactions 1 and 2; however, it does indicate the total amount of lithium metal and of |half alkylene-hal consumed.

(5)

The fraction of lithium consumed $$= \frac{\text{(acid titer at beginning of reaction)} - \text{(acid titer at time in question)}}{\text{acid titer at beginning of reaction}}$$

The fraction of the lithium expected to be consumed at the end of the reaction will be:

(6)

Fraction of Li expected to be consumed $$= \frac{2(\text{gram-moles of half alkylene-hal charged})}{\text{gram-atoms of Li charged}}$$

The fractional extent to which the reaction has proceeded will be obtained from the figures derived by Equations 5 and 6, thus:

(7)

Extent of reaction $$= 1 - \frac{(\text{Fraction of lithium expected to be consumed}) - (\text{Fraction of lithium consumed})}{(\text{Fraction of lithium expected to be consumed})}$$

Generally, it will be found desirable to prosecute the reaction until the decrease in titer from the beginning of the reaction indicates that the reaction has proceeded to the extent of 90%, and preferably more than 99%.

It will be noted that Reactions 1 and 2 each yield one mole of halide ion. Over any given interval, the increase in titer with silver-nitrate of samples of the reaction mass will thus theoretically be exactly equivalent to the decrease in the titer of the reaction mass with hydrochloric acid, and may be used as a check determination.

In order to determine the amount of alkylene dilithium formed per Reaction 1, use may be made of the very much more rapid reaction (see Gilman and Haubein, J. Am. Chem. Soc. 66, 1515–6 (1944)) (compared to lithium metal) of alkylene dilithiums with benzyl chloride in absolutely dry ether according to the reaction:

(8)

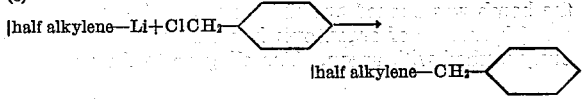

Thus, the contribution of LiOH from Reaction 3 is destroyed and the decrease in acid titer from before, to after, the treatment of the mass with benzyl chloride is a direct measure of the amount of half alkylene-Li present. On this basis:

(9)
$$\frac{\text{gram moles of [half alkylene-Li]}}{\text{gram moles of [half alkylene-Li] + gram atoms of Li}}$$

$$= \frac{\text{acid titer before treatment with benzyl chloride} - \text{acid titer after treatment with benzyl chloride}}{\text{acid titer before treatment with benzyl chloride}}$$

The detailed procedure for making this determination is described below in Example I.

With the foregoing general discussion in mind, there are given herewith detailed examples of the practice of this invention. All parts given are by weight.

*Example I.—Trimethylene dilithium*

| | |
|---|---|
| 1,3-dichloropropane | 28.25 (0.25 mole). |
| Lithium paste (34.62% dispersion of lithium in vaseline; lithium contains 0.33% of sodium alloyed therewith) | 40.09 grams (contains 13.88 grams, or 2.00 gram-atoms of lithium). |
| Heptane (dried, purified) | 400 ml. |

For this preparation there was provided a cylindrical stainless steel bomb having a 3-inch inside diameter and 7.5-inch inside length, containing six cylindrical stainless steel rods 0.5 inch in diameter by 7.0 inches in length. The 1,3-dichloropropane, lithium paste and heptane were charged into the bomb, the air was flushed out with argon, and the bomb sealed. The whole was then placed on a roller cradle and revolved about its axis (horizontal) at 25° C. at the rate of 46 r.p.m. for a total of 185 hours. At the end of this period the bomb was opened (little or no pressure observed) and the black slurry transferred as quantitatively as possible, while flooding with argon, into a storage bottle previously flushed with argon. The clingage on the bomb and rods was rinsed into the storage bottle with 150 ml. of heptane, after which the bottle was flushed with argon and capped with a neoprene-lined crown cap provided with a hole for the hypodermic withdrawal of samples. The total volume of the slurry was 588 ml. This slurry was taken as a technical preparation of trimethylene dilithium.

An assay of the product was made as follows. One ml. of slurry was treated with water and titrated to methyl orange with hydrochloric acid. Another ml. of slurry was shaken for two minutes in an argon atmosphere with 1.4 ml. of dry benzyl chloride, 10 ml. of ether (dried over sodium for several days) and twenty-five 0.25-inch stainless steel balls, and then treated with water and titrated to methyl orange end-point with hydrochloric acid. Likewise, all of the clingage on the bomb and rods not rinsed into the storage bottles was treated with water and titrated with hydrochloride acid to methyl orange. Following is a summary of results.

| | |
|---|---|
| Titration of 1 ml. of slurry direct | 12.78 ml. of 0.20187 N HCl. |
| Titration of 1 ml. of slurry after treatment with benzyl chloride | 10.58 ml. of 0.20187 N HCl. |
| Titration of clingage | 65.10 ml. of 0.20187 N HCl. |

From these figures it is calculated that the slurry contained 0.017904 gram per ml. of titratable lithium, of which 17.2% or 0.00308 g. is in the form of lithium as trimethylene dilithium; and that 93.96% of the 1,3-trichloropropane supplied reacted either via Wurtz-Fittig reactions or formation of trimethylene dilithium.

*Example II.—Tetramethylene dilithium*

VARIATION OF TEMPERATURE AND ALLOY

| | |
|---|---|
| Lithium dispersion (in petrolatum; concentration of dispersion and percentage sodium alloyed per Table I) | Per Table I (10 gram-atoms of lithium). |
| 1,4-dichlorobutane (F.P. −38.02° C.) | 317.5 g. (2.5 gram-moles). |
| Heptane | 2000 ml. |

A series of runs was made in accordance with the foregoing recipe, varying the temperature and/or percentage of sodium alloyed with the lithium from run to run as set forth in Table I.

In each of the runs, the apparatus employed was a Szegvari Attritor, Type SV, Size IS, No. 480. The pot was of stainless steel, 19.0 cm. inside diameter by 17.2 cm. deep, and contained 440° grams of ¼-inch stainless steel balls. Cooling water was circulated in the jacket surrounding the pot at a temperature and at a rate set forth in Table I. Likewise set forth is the range of temperatures prevailing in the reactor during the process. Connections were provided to maintain a slight positive pressure (2–4 mm.) of argon in the free space of the reactor.

In each run, the lithium paste and heptane were charged into the attritor pot, the apparatus closed and purged with argon, and circulation of cooling water in the jacket commenced. The dichlorobutane was then added through the porthole, and rotation of the agitator commenced at 120–180 r.p.m.

Samples of the reaction mass were removed from time to time. As the reaction proceeded, the color of the slurry changed from dark gray to stone gray. At the start of the reaction, a 1.00-ml. aliquot would titrate 19.4 ml. of 0.20205 N hydrochloric acid. The titer of the successive samples decreased until it approached one-half of the original titration, indicating that the reaction was substantially complete. When these tests or the appearance of the slurry indicated that the reaction was complete, the apparatus was unloaded.

To unload the attritor, the porthole was opened and a transfer tube inserted to a depth just clearing the bottom of the attritor pot. Four 28-ounce, dry argon-filled bottles were placed in readiness and, with the agitator revolving, the slurry was forced into the first three bottles with argon pressure. As each bottle was filled, it was promptly covered, flushed with argon and sealed with a neoprene-lined crown cap having a perforation for hypodermic withdrawal of samples. The clingage remaining in the apparatus was rinsed over into the fourth bottle by successively introducing two or three 200–250 ml. portions of heptane into the pot, and pressuring these portions each in turn over into the fourth bottle, which was sealed after the last such rinse. After the last bottle was capped, the attritor was opened, rinsed with water to remove any adhering solid, and the rinsings saved.

The volume of the slurry in each bottle was measured, and an aliquot titrated with standardized hydrochloric acid to the faintest methyl orange change. Also the water in the final rinse was titrated. The total amount of lithium calculated from these titrations to be present in the bottles and in the water rinse was calculated, and the ratio of this figure to the weight of lithium charged was taken. From these figures, the extent of reaction was calculated per Equation 7 above. Likewise a sample of the product from one of the bottles (the first one filled) was reacted with benzyl chloride and thereafter titrated as in Example I, and the fraction of the titratable lithium contained in the tetramethylene dilithium calculated by Equation 9 from this titer and the titer of the product in the same bottle before reacting with the benzyl chloride. The results for the several runs are set forth herewith in Table I. From the table it will be evident that conditions favoring a more rapid reaction result in higher proportions of the desired alkylene dilithium compounds in the product; compare runs Nos. 1 and 2 (increasing temperature) and the series of runs Nos. 2–8 (increasing content of sodium in the alloy). Comparing runs Nos. 2 and 9, it will be seen that best results are obtained when all of the dichlorobutane is added at the outset.

There was provided for this preparation a stainless steel bomb having an internal diameter of 3.0 inches and internal length of 7.5 inches and loaded with six cylindrical stainless steel rods 0.5 inch in diameter by 7.5 inches in length. The air in the bomb was flushed out with argon, the listed materials charged, and the bomb sealed. The bomb was then placed on a roller cradle and revolved at the rate of one turn per second at 25° C. for 383.5 hours. At the end of this period the bomb was opened and the dark gray slurry was pressured by means of argon over into a storage bottle previously flushed with argon. The clingage to the apparatus

TABLE I

| Alloyed Sodium in Lithium (Percent) | Amount of Lithium Dispersion Used (grams) | Lithium Content of Dispersion (Percent) | Reaction Period (hours) | Temperature Range in Reactor (° C.) | Total Titratable Lithium in Slurry and Aqueous Rinse (grams) | Extent of all Reactions (Percent) | Fraction of Lithium Present as Tetramethylene Dilithium (Percent) | Run No. |
|---|---|---|---|---|---|---|---|---|
| 0.04 [1] | 196.88 | 35.25 | 94.5 | 10 –19 | 36.229 | 95.6 | 26.2 | 1 |
| 0.04 | 198.12 | 35.03 | 55 | 23.3–27.0 | 34.696 | 98.92 | 40.4 | 2 |
| 0.23 | 199.21 | 34.82 | 28⅔ | 25.0–26.6 | 35.027 | 99.06 | 61.15 | 3 |
| 0.33 | 197.6 | 35.13 | 23⅔ | 25.0–26.7 | 34.684 | 100 | 61.3 | 4 |
| 0.55 | 200.46 | 34.62 | 23½ | 25.0–26.0 | 35.043 | 99.01 | 62.7 | 5 |
| 0.75 | 199.60 | 34.77 | 23 | 25.0–26.7 | 34.126 | 100 | 63.8 | 6 |
| 1.115 | 202.75 | 34.23 | 23½ | 25.3–26.9 | 34.649 | 100 | 65.2 | 7 |
| 1.115 | 202.75 | 34.23 | 23⅔ | 25.0–26.7 | 34.227 | 100 | 64.2 | 8 |
| 0.04 [1] | 196.88 | 35.25 | [2] 96ᵃ | 25.0–26.6 | 39.798 | 85.32 | 24.0 | 9 |

[1] This alloy also contained 0.02% potassium.
[2] The 1,4-dichlorobutane was added in 5 equal portions during the course of the first 55.75 hours of reaction

Example III.—Pentamethylene dilithium

Lithium dispersion (34.62% dispersion of lithium in petrolatum: lithium contains 0.33% sodium, alloyed therein) _____ 40.09 g. (13.88 grams of lithium: 2.00 g.-atoms).
1,5-dichloropentane (F.P. −70.22° C. $n_D^{20}$ 1.4563) _____ 70.53 g. (0.500 g.-mole).
Heptane (dried, purified) _____ 400 ml.

The apparatus of Example I was used in the preparation. The ingredients listed above were charged into the cylinder containing the rods, the interior of the cylinder was flushed with argon, and the cylinder sealed shut. The whole was rotated on the roller-cradle for 280.5 hours at 25° C. at the rate of 46 r.p.m. The cylinder was then removed from the cradle and opened, and the slurry was pressured with argon over into a storage bottle (previously flushed with argon) and the clingage rinsed with heptane into the bottle. The storage bottle was then flushed with argon and sealed with a crown cap provided with an aperture and rubber seal for hypodermic withdrawal of specimens. The total volume of slurry and rinsings in the bottle was 630 ml. By titration of samples of the slurry with acid before and after treatment with benzyl chloride, as in the preceding examples, it was determined that each ml. of the product contained 0.011250 gram of titratable lithium, of which 41.1%, or 0.004620 gram are active and present in combination as pentamethylene dilithium. The total titratable lithium in the bottle was 630×0.011250=7.0875 grams, and titration of water washings of the apparatus indicated the presence of 0.0121 gram of titratable lithium in the washings, making a total of 7.0996 g. of titratable lithium in the total batch. From this it was calculated that 97.70% of the 1,5-dichloropentane had reacted in the process, either via Wurtz-Fittig reaction or formation of hydrocarbon lithium.

Example IV.—Hexamethylene dilithium

Lithium dispersion (34.62% dispersion in petrolatum: the lithium contains 0.33% Na alloyed therein) _____ 40.09 g. (contains 13.88 grams or 2.00 gram-atoms of lithium).
1,6-dichlorohexane (B.P. 103–5° C. at 39–40 mm.; $n_D^{20}$ 1.4572) __ 77.54 g. (0.500 gram-mole).
Heptane (dried, purified) _____ 400 ml.

was likewise rinsed free with 270 ml. of heptane, and the rinsings pressured over into the bottle, which was then capped and sealed. Titrations of the product and of aqueous washings of the apparatus as in Example I indicated that the slurry contained 0.0094146 g. of titratable lithium per ml. of which 63.25% or 0.0059 g. are combined in hexamethylene dilithium; and that 100% of the 1,6-dichlorohexane had reacted either via Wurtz-Fittig reaction or formation of hydrocarbon lithium.

From the foregoing general discussion and detailed specific examples, it will be evident that this invention provides a novel and highly advantageous process for the manufacture of alkylene dilithium compounds. The undesirable presence, and entrainment in the product, of ether is completely avoided. The materials used, lithium metal, hydrocarbon solvents, and alkylene dihalides, are inexpensive and present no unusual hazards. The process is carried out in simple equipment, with only a minimum of skilled supervision.

What is claimed is:

1. Process which comprises grinding granular lithium metal, in the presence of an exclusively hydrocarbon solvent, with an alkylene dihalide containing 3–8 carbon atoms.

2. Process which comprises grinding granular lithium metal, in the presence of an exclusively hydrocarbon solvent, with an alkylene dichloride containing 3–8 carbon atoms.

3. Process which comprises grinding, at temperatures in the range 20°–35° C., granular lithium metal, in the presence of an exclusively hydrocarbon solvent, with an alkylene dichloride containing 3–8 carbon atoms.

4. Process which comprises grinding, at temperatures in the range 20°–35° C., granular lithium metal, in the presence of an exclusively hydrocarbon solvent, with an alkylene dichloride containing 3–8 carbon atoms, the lithium metal having 0.03–1.0% of another alkali metal alloyed therewith.

5. Process which comprises grinding granular lithium metal, in the presence of an exclusively hydrocarbon solvent, with trimethylene dichloride.

6. Process which comprises grinding granular lithium metal, in the presence of an exclusively hydrocarbon solvent, with tetramethylene dichloride.

7. Process which comprises grinding granular lithium metal, in the presence of an exclusively hydrocarbon solvent, with pentamethylene dichloride.

8. Process which comprises grinding granular lithium metal, in the presence of an exclusively hydrocarbon solvent, with hexamethylene dichloride.

9. Process which comprises grinding, at temperatures in the range 20°–35° C., granular lithium metal, in the presence of an exclusively hydrocarbon solvent, with trimethylene dichloride, the lithium metal having 0.03–1.0% of another alkali metal alloyed therewith.

10. Process which comprises grinding, at temperatures in the range 20°–35° C., granular lithium metal, in the presence of an exclusively hydrocarbon solvent, with tetramethylene dichloride, the lithium metal having 0.03–1.0% of another alkali metal alloyed therewith.

11. Process which comprises grinding, at temperatures in the range 20°–35° C., granular lithium metal, in the presence of an exclusively hydrocarbon solvent, with pentamethylene dichloride, the lithium metal having 0.03–1.0% of another alkali metal alloyed therewith.

12. Process which comprises grinding, at temperatures in the range 20°–35° C., granular lithium metal, in the presence of an exclusively hydrocarbon solvent, with hexamethylene dichloride, the lithium metal having 0.03–1.0% of another alkali metal alloyed therewith.

References Cited in the file of this patent

UNITED STATES PATENTS

| | | |
|---|---|---|
| 2,154,603 | Bley | Apr. 8, 1939 |
| 2,163,846 | Morton | June 27, 1939 |
| 2,377,779 | Hanford et al. | June 5, 1945 |
| 2,850,338 | Nobis et al. | Sept. 2, 1958 |

OTHER REFERENCES

Coats: Quarterly Review IV, No. 3 (1950), pp. 217–23.

Annotated Bibliography on the Use of Organo Lithium Compounds in Organic Synthesis, Supplement No. 3, Jan. 1, 1954, pub. by Lithium Corp. of America, abstract 161.

Coats: Organo-Metallic Compounds, pp. 3 to 5 (1956).